United States Patent
Shen et al.

(10) Patent No.: US 9,781,763 B2
(45) Date of Patent: Oct. 3, 2017

(54) RADIO LINK REESTABLISHMENT METHOD AND CONTROLLER

(71) Applicant: Huawei Technologies Co., Ltd., Shenzhen (CN)

(72) Inventors: Zhichao Shen, Shanghai (CN); Qinwen You, Shanghai (CN); Yong Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 14/140,115

(22) Filed: Dec. 24, 2013

(65) Prior Publication Data

US 2014/0113647 A1    Apr. 24, 2014

Related U.S. Application Data

(63) Continuation of application No. PCT/CN2011/076555, filed on Jun. 29, 2011.

(51) Int. Cl.
*H04W 76/02* (2009.01)
*H04W 36/00* (2009.01)

(52) U.S. Cl.
CPC ..... *H04W 76/028* (2013.01); *H04W 36/0055* (2013.01)

(58) Field of Classification Search
CPC ........... H04W 36/0055; H04W 76/028; H04W 76/02; H04W 48/16
See application file for complete search history.

(56) References Cited

U.S. PATENT DOCUMENTS

| | | | |
|---|---|---|---|
| 5,208,812 A | 5/1993 | Dudek et al. |
| 5,243,641 A | 9/1993 | Evans et al. |
| 5,867,782 A | 2/1999 | Yoon |
| 5,903,851 A | 5/1999 | Backstrom et al. |

(Continued)

FOREIGN PATENT DOCUMENTS

| | | | |
|---|---|---|---|
| CN | 102045872 A | 5/2011 |
| CN | 102083161 A | 6/2011 |

(Continued)

OTHER PUBLICATIONS

3rd Generation Partnership Project; Technical Specification Group Access Network; Radio Resource Control (RRC); Protocol specification (Release 10), 3GPP TS 25.331 V10.3.1, Apr. 2011, 1862 pages.

(Continued)

*Primary Examiner* — Dinh P Nguyen
(74) *Attorney, Agent, or Firm* — Slater Matsil, LLP

(57) ABSTRACT

Embodiments of the present invention relate to a radio link reestablishment method and a controller. The method includes: if after sending downlink signaling or downlink data for designated times, a controller receives no corresponding acknowledgment returned by a user equipment in a cell dedicated channel state, or the controller receives a radio link failure indication message sent by a base station corresponding to the user equipment, the controller instructs the user equipment to re-search for a cell to trigger a cell update procedure, thereby improving reliability of a communications service, and ensuring normal running of the communications service.

12 Claims, 3 Drawing Sheets

If after sending downlink signaling or downlink data for designated times, an RNC receives no corresponding acknowledgment returned by a UE in a CELL_DCH state, or the RNC receives a radio link failure indication message sent by a NodeB corresponding to the UE, the RNC instructs the UE to re-search for a cell — 101

The RNC receives a cell update message which is sent, in a cell that meets a preset condition for cell selection, by the UE — 102

The RNC reestablishes a radio link for the UE — 103

(56) References Cited

U.S. PATENT DOCUMENTS

| | | | |
|---|---|---|---|
| 7,346,363 B2 | 3/2008 | Lee et al. | |
| 7,756,532 B2 | 7/2010 | Wallentin et al. | |
| 8,359,024 B1 | 1/2013 | Singh et al. | |
| 2004/0022218 A1* | 2/2004 | Kim | H04L 12/1881 370/335 |
| 2005/0054298 A1* | 3/2005 | Chen | H04W 76/068 455/67.11 |
| 2005/0177620 A1 | 8/2005 | Lee et al. | |
| 2006/0154679 A1* | 7/2006 | Chang | H04B 7/2668 455/502 |
| 2006/0203780 A1 | 9/2006 | Terry | |
| 2008/0132257 A1 | 6/2008 | Fok et al. | |
| 2008/0254782 A1* | 10/2008 | Nakamata | H04W 92/14 455/418 |
| 2009/0137265 A1 | 5/2009 | Flore et al. | |
| 2010/0195507 A1* | 8/2010 | Marinier | H04L 1/20 370/242 |
| 2010/0255807 A1 | 10/2010 | Umatt et al. | |
| 2010/0265919 A1* | 10/2010 | Ma | H04W 76/068 370/332 |
| 2011/0077004 A1* | 3/2011 | Aoyagi | H04W 48/08 455/434 |

FOREIGN PATENT DOCUMENTS

| | | |
|---|---|---|
| EP | 1659815 A1 | 5/2006 |
| EP | 2244411 A2 | 10/2010 |
| WO | 2006066396 A1 | 6/2006 |
| WO | 2010057127 A1 | 5/2010 |

OTHER PUBLICATIONS

Chinese Office Action received in Application No. 201180000852.5 mailed Oct. 15, 2012, 6 pages.
International Search Report and Written Opinion received in Application No. PCT/CN2011/076555 mailed Mar. 29, 2012, 11 pages.

* cited by examiner

RADIO LINK REESTABLISHMENT METHOD AND CONTROLLER

This application is a continuation of International Application No. PCT/CN2011/076555, filed on Jun. 29, 2011, which is hereby incorporated by reference in entirety.

TECHNICAL FIELD

Embodiments of the present invention relate to communications technologies and in particular to a radio link reestablishment method and a controller.

BACKGROUND

In a universal mobile telecommunication system (UMTS), when a user equipment (UE) in a cell dedicated channel (CELL_DCH) state moves and signal strength of a cell that currently serves the UE suddenly decreases, or the UE enters a neighboring cell at a very fast moving speed, a radio network controller (RNC) cannot switch the UE to a new cell in time while a current cell cannot serve the UE. In this case, if after sending downlink signaling or downlink data for a plurality of times, the RNC receives no acknowledgment returned by the UE, or the RNC receives a radio link failure indication message sent by a base station (NodeB), the RNC may release a radio resource control (RRC) connection of the UE, resulting in a failure of a communications service being performed by the UE, for example, call drop. Therefore, reliability of the communications service decreases. Other communications systems also have similar problems.

SUMMARY OF THE INVENTION

Embodiments of the present invention provide a radio link reestablishment method and a controller, which are used to improve reliability of a communications service and ensure normal running of the communications service.

In one aspect, a radio link reestablishment method is provided, including instructing, by a controller, a user equipment to re-search for a cell if after sending downlink signaling or downlink data for designated times, the controller receives no corresponding acknowledgment returned by the user equipment in a cell dedicated channel state, or the controller receives a radio link failure indication message sent by a base station corresponding to the user equipment. A cell update message sent by the user equipment is received by the controller in a cell that meets a preset condition for cell selection. A radio link for the user equipment is reestablished by the controller.

In another aspect, a controller is provided, including an instructing unit configured to instruct a user equipment to re-search for a cell if after sending downlink signaling or downlink data for designated times, the controller receives no corresponding acknowledgment returned by the user equipment in a cell dedicated channel state, or the controller receives a radio link failure indication message sent by a base station corresponding to the user equipment. A receiving unit is configured to receive a cell update message which is sent by the user equipment in a cell that meets a preset condition for cell selection. An establishing unit is configured to reestablish a radio link for the user equipment.

It can be known from the foregoing technical solutions that, the controller in the embodiment of the present invention may instruct the user equipment to re-search for a cell to trigger a cell update procedure if after sending the downlink signaling or the downlink data for designated times, the controller receives no corresponding acknowledgment returned by the user equipment in the CELL_DCH state, or the controller receives the radio link failure indication message sent by the base station corresponding to the user equipment. In this way, a failure which is a failure of a communications service being performed by the user equipment and caused by that the controller releases an RRC connection of the user equipment in the prior art can be avoided, thereby improving the reliability of the communications service, and ensuring the normal running of the communications service.

BRIEF DESCRIPTION OF THE DRAWINGS

To illustrate the technical solutions in the embodiments of the present invention or in the prior art more clearly, accompanying drawings required for describing the embodiments or the prior art are briefly introduced in the following. Apparently, the accompanying drawings in the following description are merely some embodiments of the present invention, and persons of ordinary skill in the art may further obtain other drawings according to these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly and completely describes the technical solutions according to the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various communications systems, such as a global system for mobile communications (GSM), a general packet radio service (GPRS) system, a code division multiple access (CDMA) system, a wideband code division multiple access (WCDMA) system, and a time division-synchronous code division multiple access (TD-SCDMA) system. However, for ease of description, the following embodiments take the WCDMA system as an example for description.

A base station, for example, may be a base station (BTS) in the GSM system, the GPRS system, or the CDMA system, and may also be a base station (NodeB) in the WCDMA system, which is not limited in the present invention. However, for ease of description, the following embodiments take the NodeB as an example for description.

A controller, for example, may be a base station controller (BSC) in the GSM system, the GPRS system, or the CDMA system, and may also be a radio network controller (RNC) in the WCDMA system, which is not limited in the present invention. However, for ease of description, the following embodiments take the RNC as an example for description.

Figure 1:
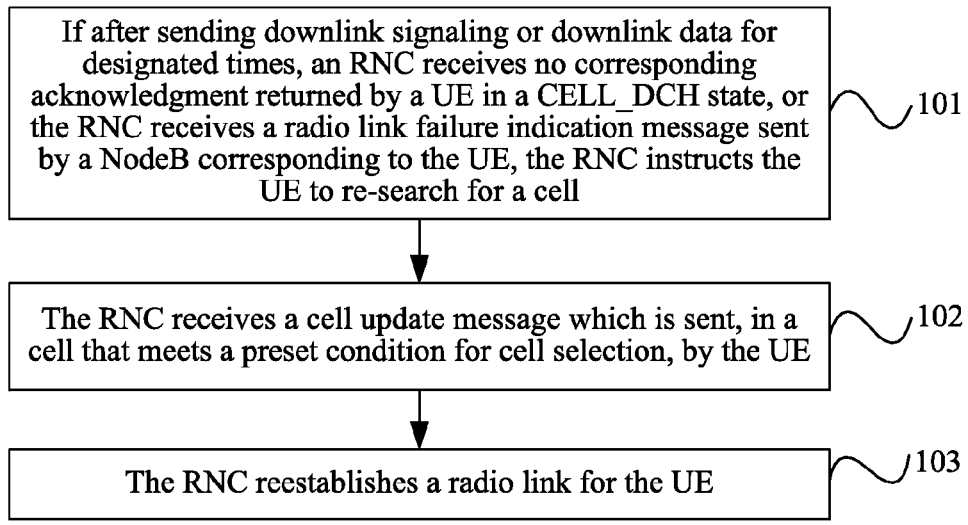
FIG. 1 is a schematic flow chart of a radio link reestablishment method according to an embodiment of the present invention.

FIG. 1 is a schematic flow chart of a radio link reestablishment method according to an embodiment of the present invention. As shown in FIG. 1, the radio link reestablishment method in this embodiment may include:

101. If after sending downlink signaling or downlink data for designated times, an RNC receives no corresponding acknowledgment returned by a UE in a CELL_DCH state, or the RNC receives a radio link failure indication message sent by a NodeB corresponding to the UE, the RNC instructs the UE to re-search for a cell.

Specifically, if after sending the downlink signaling or the downlink data for designated times, the RNC receives no corresponding acknowledgment returned by the UE in the CELL_DCH state, it indicates that signal quality between the RNC and the UE deteriorates and a communications service cannot be performed. In this case, the RNC has detected a reset of a downlink signaling radio bear (SRB) or a reset of a downlink traffic radio bear (TRB). Then, the RNC instructs the UE to re-search for a cell. Alternatively, the NodeB has detected an uplink radio link failure between the UE in the CELL_DCH state and the NodeB. In this case, the RNC receives the radio link failure indication message sent by the NodeB. Then, the RNC instructs the UE to re-search for a cell.

Specifically, the RNC may instruct the UE to re-search for a cell in multiple manners.

For example, the RNC may send instruction information for disabling a radio link transmitter to the NodeB to instruct the NodeB to disable a radio link transmitter corresponding to the UE, so as to trigger a re-search for a cell by the UE. According to the instruction information, the NodeB disables the radio link transmitter corresponding to the UE, that is, the NodeB no longer sends any signal to the UE. In this case, because the NodeB no longer sends any signal to the UE, the UE may be triggered and re-searches for a cell. For example, if the UE has detected a downlink radio link failure, or if after sending uplink signaling or uplink data for designated times, the UE receives no corresponding acknowledgment returned by the RNC, the UE may re-search for a cell. Specifically, the instruction information for disabling the radio link transmitter may be carried in a new message, and the instruction information for disabling the radio link transmitter may also be carried by modifying an existing message. For example, the instruction information for disabling the radio link transmitter may be carried in a radio link active command message.

For another example, the RNC may send cell search instruction information to the UE through the NodeB to instruct the UE to re-search for a cell. The UE re-searches for a cell according to the instruction information. Specifically, in this embodiment of the present invention, the RNC may instruct the UE to re-search for a cell specifically by carrying the cell search instruction information in different positions of a frame protocol (FP) frame that is sent to the NodeB. For example, the RNC carries the cell search instruction information in a payload of the FP frame, and the NodeB transparently transfers the instruction information to the UE without parsing the cell search instruction information in the payload, so as to instruct the UE to re-search for a cell. For another example, the RNC carries the cell search instruction information in a header of the FP frame, and the NodeB parses the cell search instruction information in the header, and then forwards the instruction information to the UE, so as to instruct the UE to re-search for a cell.

102. The RNC receives a cell update message which is sent, in a cell that meets a preset condition for cell selection, by the UE.

The cell update message received by the RNC carries a cause value to indicate a radio link failure.

Specifically, there may be multiple methods for selecting the cell that meets the preset condition for cell selection. For example, a cell is randomly selected among all cells whose signal strength is greater than or equal to a preset strength threshold; for another example, a cell with maximum signal strength is selected among all cells whose signal strength is greater than or equal to the preset strength threshold. The foregoing description is only exemplary, and is not limited in this embodiment of the present invention.

103. The RNC reestablishes a radio link for the UE.

Specifically, the RNC may delete a radio link that is previously established for the UE and reestablish a new radio link for the UE.

In this embodiment, when the UE in the CELL_DCH state moves and signal strength of a cell that currently serves the UE suddenly decreases, or the UE enters a neighboring cell at a very fast moving speed, and if after sending downlink signaling or downlink data for designated times, a controller receives no corresponding acknowledgment returned by the UE in the CELL_DCH state, or the controller receives a radio link failure indication message sent by a base station corresponding to the UE, the controller in this embodiment of the present invention may instruct the UE to re-search for a cell to trigger a cell update procedure. In this way, a failure which is of a communications service being performed by the UE and caused by that the controller releases an RRC connection of the user equipment in the prior art can be avoided, thereby improving reliability of the communications service, and ensuring normal running of the communications service.

Figure 2:
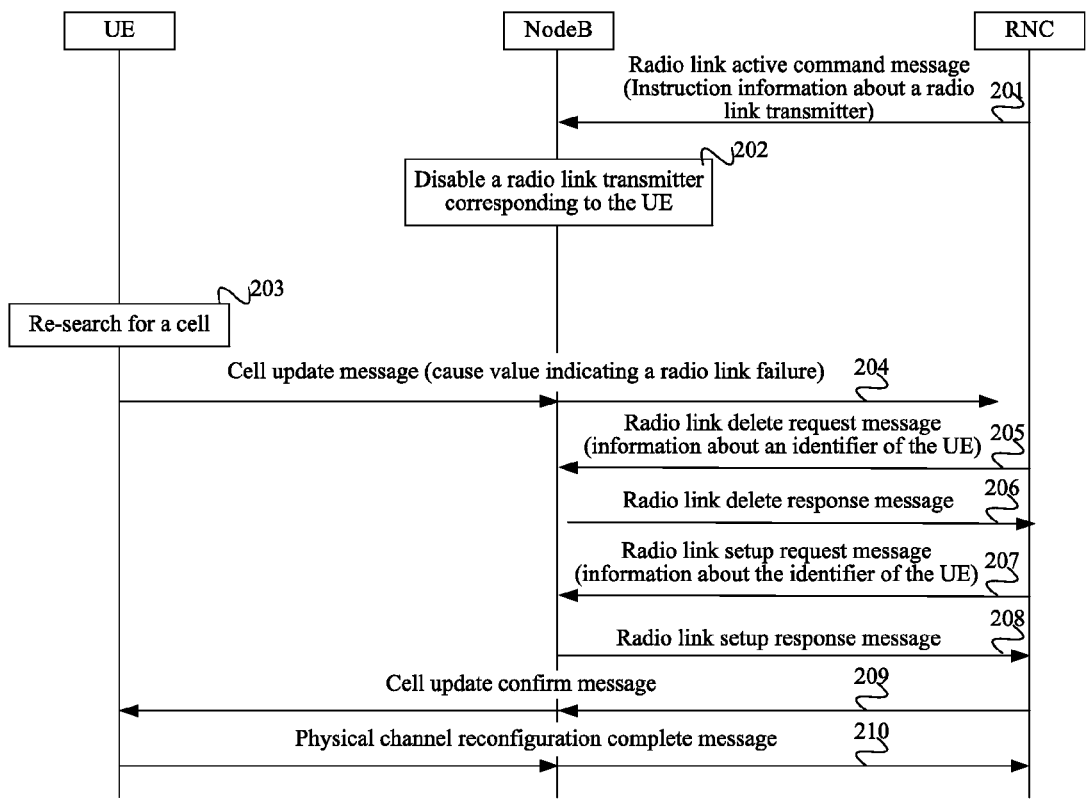
FIG. 2 is a schematic flow chart of a radio link reestablishment method according to another embodiment of the present invention.

FIG. 2 is a schematic flow chart of a radio link reestablishment method according to another embodiment of the present invention. In this embodiment, as shown in FIG. 2, the radio link reestablishment method according to this embodiment may include:

201. An RNC sends a radio link active command message to a NodeB, where the radio link active command message includes instruction information about a radio link transmitter to instruct the NodeB to disable a radio link transmitter corresponding to a UE.

For example, when the UE is in a CELL_DCH state, and if after sending downlink signaling or downlink data for designated times, the RNC receives no corresponding acknowledgment returned by the UE, or the RNC receives a radio link failure indication message sent by a NodeB corresponding to the UE, the RNC sends the radio link active command to the NodeB.

202. The NodeB disables the radio link transmitter corresponding to the UE.

In this way, the NodeB no longer sends any signal to the UE, so as to trigger the UE to re-search for a cell.

203. Because the NodeB no longer sends any signal to the UE, if the UE has detected a downlink radio link failure, or after sending uplink signaling or uplink data for designated times, the UE receives no acknowledgment returned by the RNC, the UE re-searches for a cell.

204. The UE sends, in a cell that meets a preset condition for cell selection, a cell update message to the RNC through the NodeB, where the cell update message carries a cause value to indicate a radio link failure.

205. According to the cell update message, the RNC identifies a cell where the UE is located, and sends a radio link delete request message to the NodeB, where the radio link delete request message includes information about an identifier of the UE.

206. The NodeB deletes a radio link established for the UE, and sends a radio link delete response message to the RNC.

The radio link established by the NodeB for the UE may be deleted through 205 and 206.

207. The RNC sends a radio link setup request message to the NodeB, where the radio link setup request message includes the information about the identifier of the UE.

208. The NodeB reestablishes a new radio link for the UE, and sends a radio link setup response message to the RNC.

209. The RNC sends a cell update confirm message to the UE.

210. The UE reestablishes the radio link and sends a physical channel reconfiguration complete message to the RNC.

A new radio link is reestablished for the UE through 207 to 210 and interaction between the RNC, the NodeB, and the UE.

In this embodiment, if after sending the downlink signaling or the downlink data for designated times, the RNC receives no corresponding acknowledgment returned by the UE, or the RNC receives the radio link failure indication message sent by the NodeB, the RNC instructs the NodeB to disable the radio link transmitter corresponding to the UE, thereby instructing the UE to re-search for a cell to trigger a cell update procedure. In this way, a failure which is of a communications service being performed by the user equipment and caused by that the controller releases an RRC connection of the user equipment in the prior art can be avoided, thereby improving reliability of the communications service, and ensuring normal running of the communications service.

Figure 3:
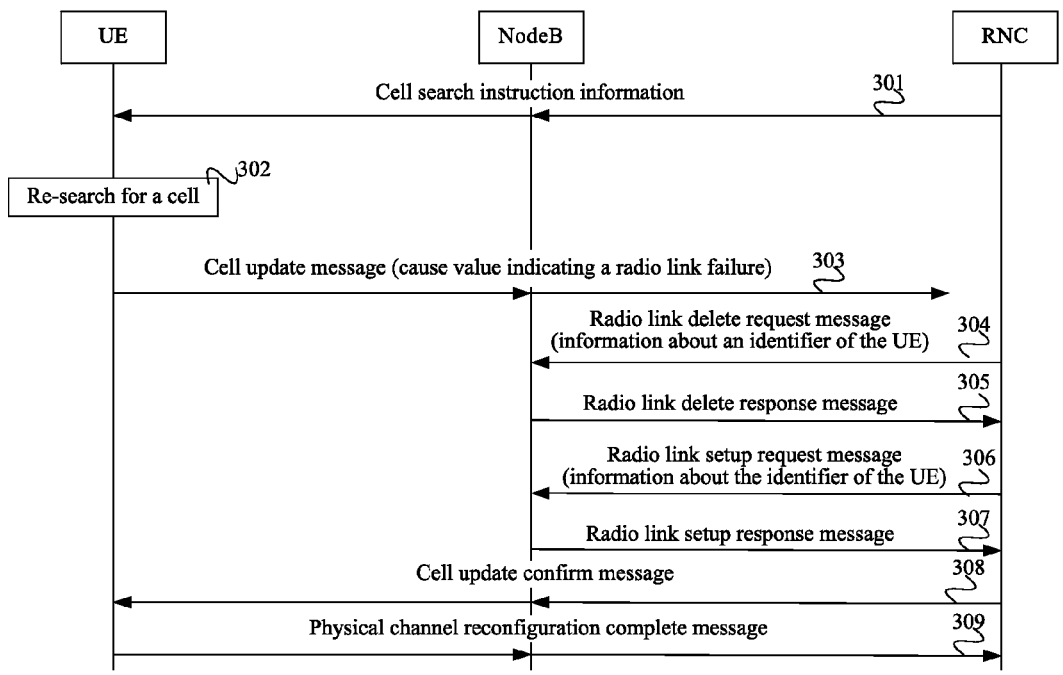
FIG. 3 is a schematic flow chart of a radio link reestablishment method according to another embodiment of the present invention.

FIG. 3 is a schematic flow chart of a radio link reestablishment method according to another embodiment of the present invention. In this embodiment, as shown in FIG. 3, the radio link reestablishment method according to this embodiment may include:

301. An RNC sends cell search instruction information to a UE through a NodeB to instruct the UE to re-search for a cell.

For example, when the UE is in a CELL_DCH state, and if after sending downlink signaling or downlink data for designated times, the RNC receives no corresponding acknowledgment returned by the UE, or the RNC receives a radio link failure indication message sent by a NodeB corresponding to the UE, the RNC sends the cell search instruction information to the UE through the NodeB.

For example, the RNC carries the cell search instruction information in a payload of an FP frame, and the NodeB transparently transfers the instruction information to the UE without parsing the cell search instruction information in the payload, so as to instruct the UE to re-search for a cell.

For another example, the RNC carries the cell search instruction information in a header of the FP frame, and the NodeB parses the cell search instruction information in the header, and then forwards the instruction information to the UE, so as to instruct the UE to re-search for a cell.

302. The UE re-searches for a cell according to the cell search instruction information.

303. The UE sends, in a cell that meets a preset condition for cell selection, a cell update message to the RNC through the NodeB, where the cell update message carries a cause value to indicate a radio link failure.

304. According to the cell update message, the RNC identifies a cell where the UE is located, and sends a radio link delete request message to the NodeB, where the radio link delete request message includes information about an identifier of the UE.

For example, the RNC may identify, according to the cell that receives the cell update message, the cell where the UE is located.

305. The NodeB deletes a radio link established for the UE, and sends a radio link delete response message to the RNC.

The radio link established by the NodeB for the UE is deleted through 304 and 305.

306. The RNC sends a radio link setup request message to the NodeB, where the radio link setup request message includes information about the identifier of the UE.

307. The NodeB reestablishes a new radio link for the UE, and sends a radio link setup response message to the RNC.

308. The RNC sends a cell update confirm message to the UE.

309. The UE reestablishes the radio link and sends a physical channel reconfiguration complete message to the RNC.

The new radio link is reestablished for the UE through 306 to 309 and interaction between the RNC, the NodeB, and the UE.

In this embodiment, if after sending the downlink signaling or the downlink data for designated times, the RNC receives no corresponding acknowledgment returned by the UE, or the RNC receives the radio link failure indication message sent by the NodeB, the RNC sends the cell search instruction information to the UE through the NodeB to instruct the UE to re-search for a cell, so as to trigger a cell update procedure. In this way, a failure which is of a communications service being performed by the user equipment and caused by that the controller releases an RRC connection of the user equipment in the prior art can be avoided, thereby improving reliability of the communications service, and ensuring normal running of the communications service.

It should be noted that, for brevity, the foregoing method embodiments are described as a series of action combinations. But persons skilled in the art should understand that the present invention is not limited to order of the described actions, because according to the present invention, some steps may adopt other order or be performed simultaneously. Further, persons skilled in the art should also understood that the described embodiments in this specification are all exemplary embodiments, and the involved actions and modules are not necessarily required by the present invention.

In the foregoing embodiments, description of each of the embodiments has respective focuses. For part that is not described in detail in a certain embodiment, reference may be made to related description in other embodiments.

Figure 4:
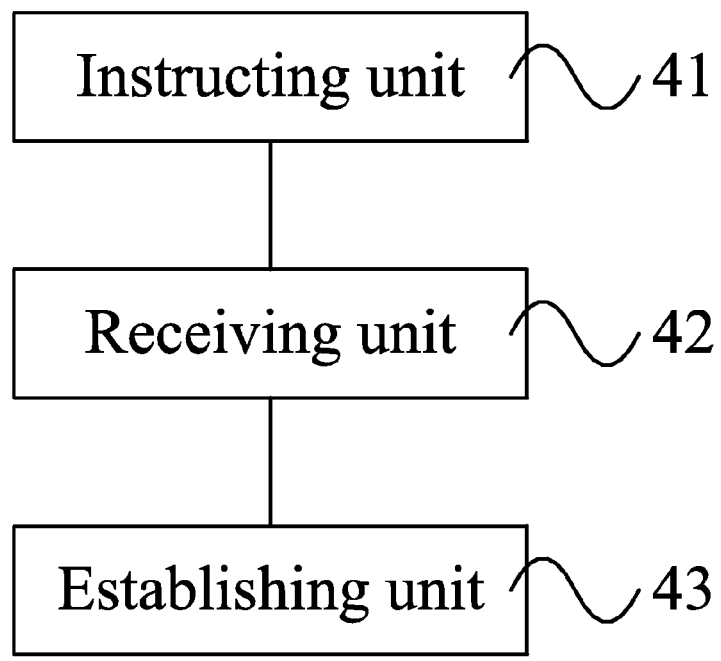
FIG. 4 is a schematic structural diagram of a controller according to another embodiment of the present invention.

FIG. 4 is a schematic structural diagram of a controller according to another embodiment of the present invention. As shown in FIG. 4, the controller in this embodiment may include an instructing unit 41, a receiving unit 42, and an establishing unit 43. The instructing unit 41 is configured to instruct a user equipment to re-search for a cell if after sending downlink signaling or downlink data for designated times, the controller receives no corresponding acknowledgment returned by the user equipment in a cell dedicated channel state, or the controller receives a radio link failure indication message which is of the user equipment and sent by a base station; the receiving unit 42 is configured to receive a cell update message which is sent, in a cell that meets a preset condition for cell selection, by the user equipment; and the establishing unit 43 is configured to reestablish a radio link for the user equipment.

Specifically, there may be multiple methods for selecting the cell that meets the preset condition for cell selection. For example, a cell is randomly selected among all cells whose signal strength is greater than or equal to a preset strength threshold; for another example, a cell with maximum signal strength is selected among all cells whose signal strength is greater than or equal to the preset strength threshold. The foregoing description is only exemplary, and is not limited in this embodiment of the present invention.

All functions of the RNCs in the embodiments corresponding to FIG. 1 to FIG. 3 may be performed by the controller provided in this embodiment.

That the controller provided in this embodiment is an RNC is taken as an example for detailed description. If after sending downlink signaling or downlink date for designated times, the RNC receives no corresponding acknowledgment returned by a UE in a CELL_DCH state, it indicates that signal quality between the RNC and the UE deteriorates and a communications service cannot be performed. In this case, the RNC has detected a reset of a downlink SRB or a reset of an uplink TRB. Then, the RNC instructs the UE to re-search for a cell. Alternatively, the NodeB has detected an uplink radio link failure between the UE in the CELL_DCH state and the NodeB. In this case, the RNC receives a radio link failure indication message sent by the NodeB. Then, the instructing unit 41 instructs the UE to re-search for a cell.

Figure 5:
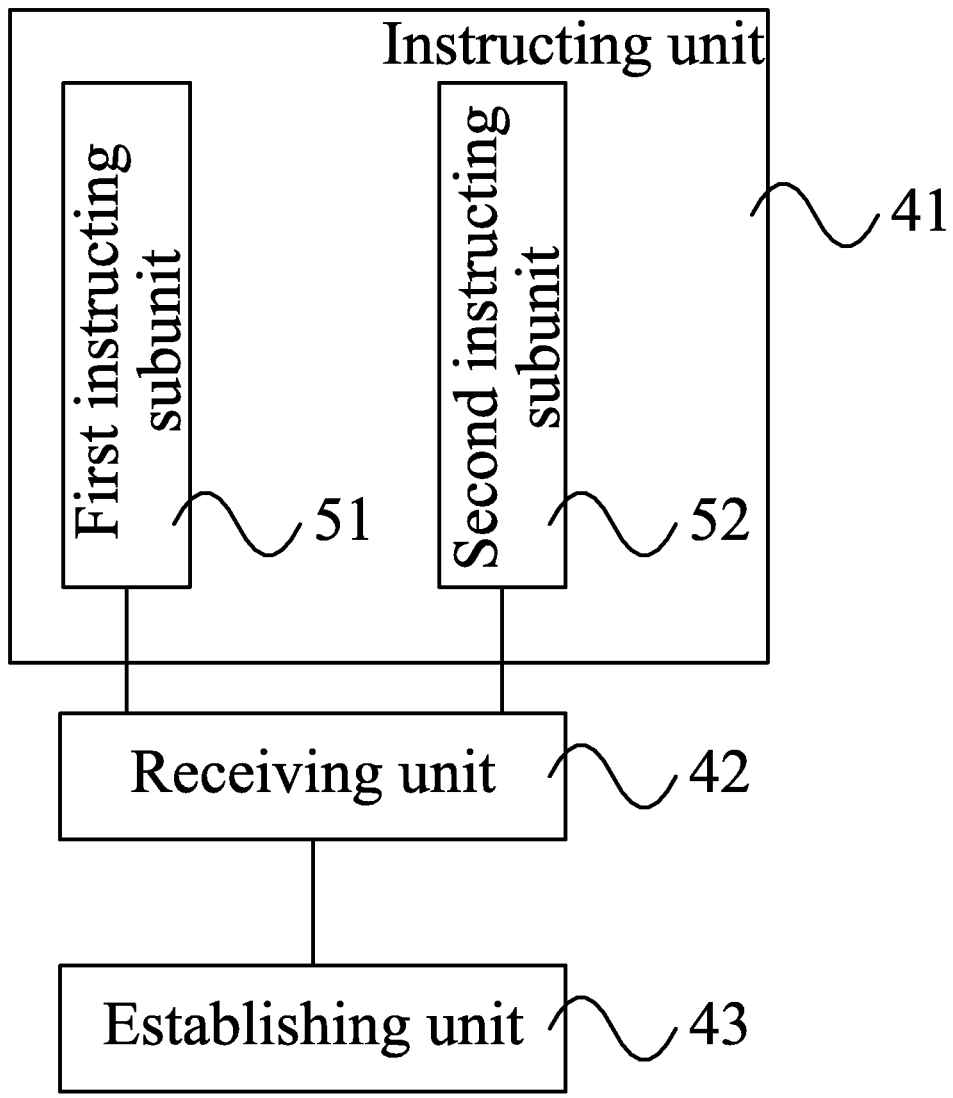
FIG. 5 is a schematic structural diagram of a controller according to another embodiment of the present invention.

Further, as shown in FIG. 5, the instructing unit 41 of the controller in this embodiment may include at least one of the following subunits. A first instructing subunit 51, configured to send instruction information for disabling a radio link transmitter to the base station to instruct the base station to disable a radio link transmitter corresponding to the UE, so as to trigger the UE to re-search for a cell. A second instructing subunit 52 is configured to send cell search instruction information to the user equipment through the base station to instruct the user equipment to re-search for a cell.

It should be noted that, FIG. 5 only shows one situation where both the first instructing subunit 51 and the second instructing subunit 52 are included. In an optional embodiment, only one of the foregoing two subunits may be included.

Specifically, the first instructing subunit 51 may send a radio link active command message to the base station, where the radio link active command message carries the instruction information for disabling the radio link transmitter. For example, according to the instruction information for disabling the radio link transmitter, the base station disables the radio link transmitter corresponding to the user equipment, that is, the base station no longer sends any signal to the UE. In this case, because the base station no longer sends any signal to the user equipment, the user equipment may be triggered and re-searches for a cell. For example: if the user equipment has detected a downlink radio link failure, or after sending uplink signaling or uplink data for designated times, the UE receives no corresponding acknowledgment returned by the controller, the user equipment re-searches for a cell.

Alternatively, the second instructing subunit 52 may specifically send an FP frame to the base station, where a payload of the FP frame includes the cell search instruction information, so that the base station transparently transfers the cell search instruction information to the user equipment. For example, if the payload of the FP frame sent by the second instructing subunit 52 to the base station carries the cell search instruction information, the NodeB transparently transfers the instruction information to the UE without parsing the cell search instruction information in the payload, so as to instruct the UE to re-search for a cell.

Alternatively, the second instructing subunit 52 may specifically further send an FP frame to the base station, where a header of the FP frame includes the cell search instruction information, so that the base station forwards the cell search instruction information to the user equipment. For example, if the header of the FP frame sent by the second instructing subunit 52 to the base station carries the cell search instruction information, the NodeB parses the cell search instruction information in the header, and then forwards the instruction information to the UE, so as to instruct the UE to re-search for a cell.

Specifically, the establishing unit 43 in this embodiment may specifically delete a radio link that is previously established for the user equipment, and reestablish a new radio link for the user equipment.

A specific process of applying the controller in this embodiment of the present invention to perform radio link reestablishment is similar to that in the foregoing method embodiments, and is not repeatedly described here.

In this embodiment, if after sending the downlink signaling or the downlink data for designated times, the controller receives no corresponding acknowledgment returned by the user equipment, or the controller receives the radio link failure indication message sent by the base station, the controller instructs, through the instructing unit, the user equipment to re-search for a cell to trigger a cell update procedure. In this way, a failure which is of a communications service being performed by the user equipment and caused by that the controller releases an RRC connection of the user equipment in the prior art can be avoided, thereby improving reliability of the communications service, and ensuring normal running of the communications service.

Persons skilled in the art may clearly learn that, for ease and brevity of description, reference may be made to corresponding processes in the foregoing method embodiments for specific working processes of the system, apparatus, and units described above, and details are not repeatedly described here.

In the several embodiments provided in this application, it should be understood that the disclosed system, apparatus, and method may be implemented in other manners. For example, the apparatus embodiments described above are merely exemplary. For example, dividing of the unit is merely a kind of logical function dividing, and there may be other dividing manners during actual implementation. For example, multiple units or components may be combined or integrated into another system, or some features may be ignored or not performed. In addition, shown or discussed mutual coupling or direct coupling or communication connections are implemented through some interfaces, and indirect coupling or communication connections of the apparatuses or units may be electronic, mechanical or in other forms.

The units described as separate parts may or may not be physically separate, and parts shown as units may or may not be physical units, may be located in one position, or may also be distributed in multiple network units. Part or all of the units may be selected according to actual needs to achieve the objectives of the solutions of the embodiments.

In addition, functional units in the embodiments of the present invention may be integrated into a processing unit, each of the units may also exist alone physically, and two or more units may also be integrated into a unit. The integrated unit may be implemented in a form of hardware, and may also be implemented in a form of a software functional unit.

When being implemented in the form of the software functional unit and sold or used as a separate product, the integrated unit may be stored in a computer readable storage medium. Based on such understanding, the technical solutions of the present invention essentially, or the part that makes contributions to the prior art, or all or part of the technical solutions may be implemented in a form of a software product. The computer software product is stored in a storage medium and includes several instructions for instructing a computer device (which may be a personal computer, a server, or a network device, and so on) to execute all or part of steps of the methods described in the embodiments of the present invention. The storage medium includes any medium that is capable of storing program codes, such as a U disk, a removable hard disk, a read-only memory (ROM), a random access memory (RAM), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions recorded in the foregoing embodiments, or make equivalent substitutions to some technical features; however, these modifications or substitutions do not make the essence of the corresponding technical solutions depart from the spirit and scope of the technical solutions of the embodiments of the present invention.

What is claimed is:

1. A radio link reestablishment method comprising:
   instructing, by a controller, a user equipment to re-search for a cell, the instructing being performed by the controller when the controller does not receive acknowledgment from the user equipment in a cell dedicated channel (DCH) state in response to downlink signaling or downlink data sent by the controller to the user equipment for designated times, or when the controller receives a radio link failure indication message sent by a base station corresponding to the user equipment in the cell DCH state, wherein the controller instructs the user equipment to re-search for the cell without releasing an established radio resource control (RRC) connection of the user equipment with the controller, and wherein the instructing the user equipment to re-search for the cell comprises:
      sending, by the controller, to the base station a frame protocol (FP) frame comprising cell search instruction information for instructing the user equipment to re-search for the cell, the cell search instruction information being transparently transferred to the user equipment through the base station;
   receiving, by the controller, a cell update message which is sent, in a selected cell that meets a preset condition for cell selection, by the user equipment; and
   reestablishing, by the controller, a radio link for the user equipment.

2. The method according to claim 1, wherein a payload of the FP frame comprises the cell search instruction information.

3. The method according to claim 1, wherein a header of the FP frame comprises the cell search instruction information.

4. The method according to claim 1, wherein the controller is a radio network controller (RNC), and the base station is a NodeB.

5. A controller, comprising:
   a memory storage comprising instructions; and
   one or more processors coupled to the memory storage, wherein the one or more processors execute the instructions to:
      send to a base station a frame protocol (FP) frame comprising cell search instruction information for instructing a user equipment that is in a cell dedicated channel (DCH) state to re-search for a cell when, after sending downlink signaling or downlink data for designated times to the user equipment, the controller receives no corresponding acknowledgment returned by the user equipment, the cell search instruction information being transparently transferred to the user equipment through the base station, wherein the controller keeps an established radio resource control (RRC) connection of the user equipment with the controller without releasing the RRC connection;
      receive a cell update message which is sent, in a selected cell that meets a preset condition for cell selection, by the user equipment; and
      reestablish a radio link for the user equipment.

6. The controller according to claim 5, wherein the cell search instruction information is included in a payload of the FP frame sent to the base station.

7. The controller according to claim 5, wherein the cell search instruction information is included in a header of the FP frame sent to the base station.

8. The controller according to claim 5, wherein the controller is a radio network controller (RNC).

9. A controller, comprising:
   a memory storage comprising instructions; and
   one or more processors coupled to the memory storage wherein the one or more processors execute the instructions to:
      send to a base station a frame protocol (FP) frame comprising cell search instruction information for instructing a user equipment that is in a cell dedicated channel (DCH) state to re-search for a cell in response to the controller receiving a radio link failure indication message sent by the base station corresponding to the user equipment, wherein the controller does not release an established radio resource control (RRC) connection of the user equipment with the controller, the cell search instruction information being transparently transferred to the user equipment through the base station;
      receive a cell update message which is sent, in a selected cell that meets a preset condition for cell selection, by the user equipment; and
      reestablish a radio link for the user equipment.

10. The controller according to claim 9, wherein the cell search instruction information is included in a payload of the FP frame sent to the base station.

11. The controller according to claim 9, wherein the cell search instruction information is included in a header of the FP frame sent to the base station.

12. The controller according to claim 9, wherein the controller is a radio network controller (RNC).

\* \* \* \* \*